United States Patent [19]

Beeman et al.

[11] 4,094,492

[45] June 13, 1978

[54] VARIABLE ORIFICE USING AN IRIS SHUTTER

[75] Inventors: Raymond Beeman, El Cerrito; Steven J. Brajkovich, Fremont, both of Calif.

[73] Assignee: The United States of America as represented by the United States Department of Energy, Washington, D.C.

[21] Appl. No.: 760,305

[22] Filed: Jan. 18, 1977

[51] Int. Cl.² .................. F16K 31/54; F16K 3/06
[52] U.S. Cl. .......................... 251/212; 138/45
[58] Field of Search .................. 251/212; 138/45

[56] References Cited

U.S. PATENT DOCUMENTS

| | | | |
|---|---|---|---|
| 2,037,663 | 4/1936 | Lalor | 251/212 |
| 2,321,336 | 6/1943 | Tondreau | 251/212 |
| 2,649,272 | 8/1953 | Barbato | 251/212 |

*Primary Examiner*—Arnold Rosenthal
*Attorney, Agent, or Firm*—Dean E. Carlson; Roger S. Gaither; L. E. Carnahan

[57] ABSTRACT

A variable orifice forming mechanism utilizing an iris shutter arrangement adapted to control gas flow, conductance in vacuum systems, as a heat shield for furnace windows, as a beam shutter in sputtering operations, and in any other application requiring periodic or continuously-variable control of material, gas, or fluid flow.

4 Claims, 7 Drawing Figures

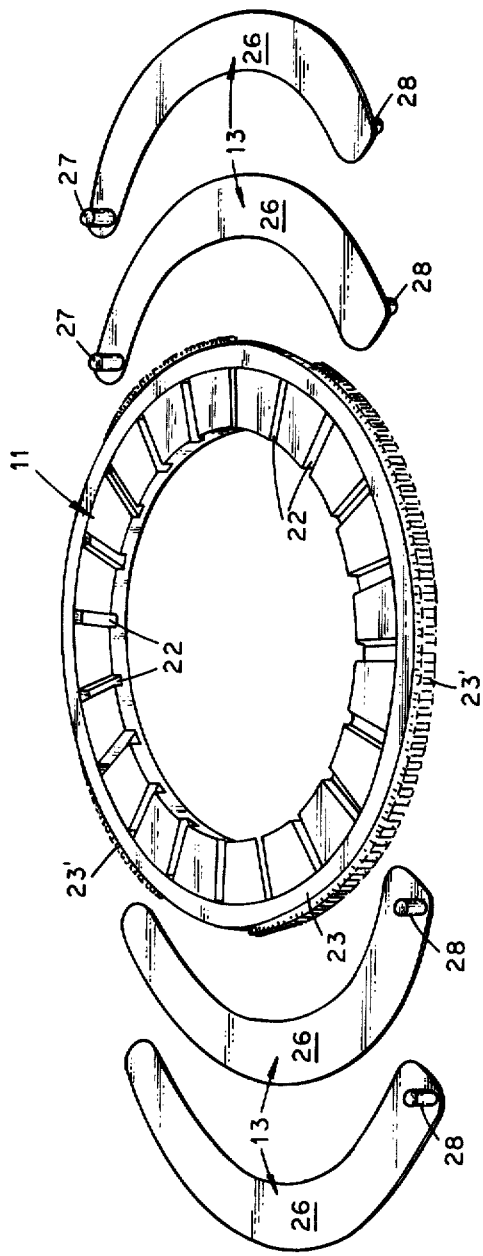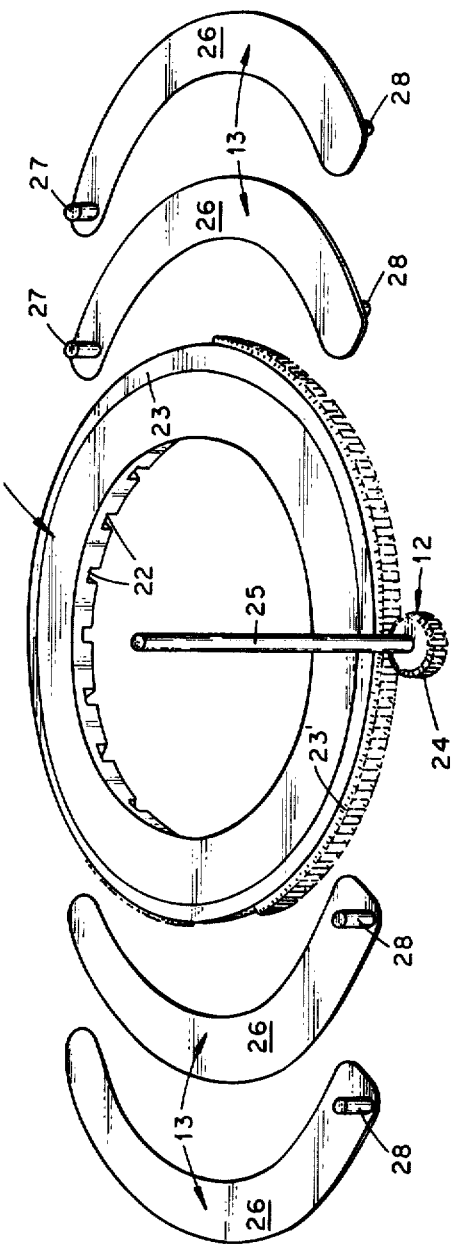

VARIABLE ORIFICE USING AN IRIS SHUTTER

BACKGROUND OF THE INVENTION

The invention described herein was made in the course of, or under, Contract No. W-7405-ENG-48, with the United States Energy Research and Development Administration.

The invention relates to mechanism capable of providing control of material, gas, or fluid flow, and more particularly to a variable orifice forming mechanism utilizing an iris shutter arrangement.

Various types of mechanisms are known in the art for controlling material, gas, and fluid flow. For example, in differential pumping in a vacuum system, the pumping speed has in the past been controlled by the size of a fixed orifice between the vacuum chamber and the diffusion pump. This fixed orifice is usually in the valve gate of a high-vacuum valve (or in a baffle plate). To change the pumping speed, the valve must be removed and another valve with an orifice of a different size must be inserted. This process is time consuming and risks contamination of the system, which would require another pumpdown and bakeout. Thus, there has existed in the art a need for a relative simple yet effective mechanism for applications requiring periodic or continuously-variable control of material, gas, or fluid flow.

SUMMARY OF THE INVENTION

The present invention provides a mechanism for producing periodic or continuously-variable flow control of gas, fluid, or materials. Basically the variable orifice forming mechanism comprises an iris shutter arrangement, similar to those used in cameras, scaled-up to size and applied to control gas flow, conductance in vacuum systems, as a heat shield for furnace windows, as a beam shutter in sputtering operations, or to any other application requiring periodic or continuously-variable control of a medium passing therethrough, be it gaseous, liquid, granular, etc. For example, an orifice using the iris shutter variable control mechanism of the invention may be varied from about ¼ inch up to about 6 inches, thus providing a wide range of flow rates therethrough without risks of contamination, etc. and without the consumption of time required previously to vary the flow.

Therefore, it is an object of the invention to provide a mechanism forming a variable orifice.

A further object of the invention is to provide a means for periodic or continuously-variable control of a medium flow.

Another object of the invention is to provide an iris shutter type mechanism for variably controlling flow of medium composed of gas, liquid, granules, etc.

Other objects of the invention will become apparent to those skilled in the art from the following description and accompanying drawings.

BRIEF DESCRIPTION OF THE DRAWINGS

FIG. 4 is a view showing one side of the drive ring and shutter leaves of the FIG. 1 mechanism;

FIG. 5 shows the opposite side of the FIG. 4 components plus the drive gear of the FIG. 1 mechanism;

DESCRIPTION OF THE INVENTION

Figure 1:
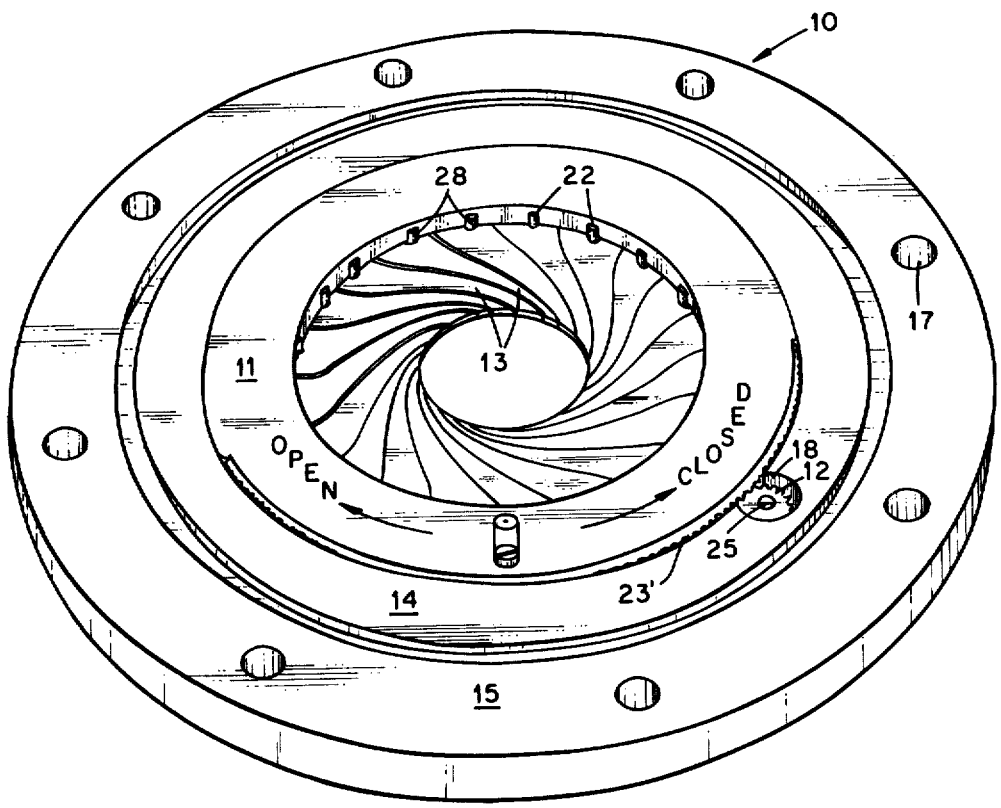
FIG. 1 is a view of the shutter mechanism of the invention in a partially closed position.

The invention comprises a variable orifice forming mechanism which includes an iris shutter type arrangement for variably controlling flow of a medium. The invention may be utilized in any application requiring continuous or periodic variable control of a medium flowing therethrough. The mechanism, for example, can be utilized to control gas flow, for differential pumping in a vacuum system, as a heat shield for furnace windows, as a beam shutter in sputtering operations, etc.

The invention, for purposes of description, will be set forth hereinafter in an application for differential pumping in a vacuum system wherein it is particularly applicable, although as pointed out above it may be utilized in other applications involving media flow.

In differential pumping, as pointed out above, the pumping speed has in the past been controlled by the size of the orifice between the vacuum chamber and the diffusion pump, and to change the pumping speed it was necessary to remove the orifice and replace it with one of a different size, thus resulting in time consuming efforts along with risks of contamination of the system resulting in another pumpdown and bakeout.

The variable orifice mechanism of this invention involves a shutter type arrangement that controls pumping speed without requiring any change in components. The shutter arrangement includes a plurality of leaves (20 in this embodiment) arranged as an iris that opens, for example, to a 6 inch diameter orifice or closes to 0.25 inch diameter. Basically, the shutter mechanism consists of a mounting ring, the leaves, a drive ring, and a drive gear, each leaf being provided with a pivot pin at one end and an offset pin at the other which match with appropriately formed holes or grooves in the mounting ring and drive ring so that rotating the drive gear moves the drive ring causing the leaves to change the orifice size.

For example, the shutter mechanism components are constructed of stainless steel. Each leaf is made of about 0.015 to about 0.011 inch thick stainless sheet. The 0.015 inch thick shutter, with 20 leaves as illustrated, will close down to only 0.75 inch; thinning the leaves to 0.011 inch by electroetching, for example, provides the extra 0.5 inch closure, whereby the embodiment illustrated in the drawings is capable of varying from a 6 inch to a 0.25 inch diameter.

As seen in the drawings, the drive mechanism for the shutter is a spur gear rack rolled inside out to form the diameter of the drive ring. It is driven by a spur gear through a vacuum feedthrough in the base plate of the vacuum system (not shown). A synchronous motor provides the power for the spur gear. The shutter mechanism can be controlled manually, automatically, with a thermocouple gage for example, or by computer.

The iris shutter variable orifice has been utilized with a 6 inch diffusion pump system. The 20 leaf shutter, having 0.011 inch leaf thickness, was placed between the cold trap and the base plate of the system. A differential was required at both a Hi Vac pumping stage and at times a mechanical pump level of vacuum, i.e., from 0μ to 1000μ, so the shutter was placed above the cold trap so it could be used for both diffusion pumping and the roughing side of the system. In this application of the shutter mechanism, the differential pressure was 100μ in the vacuum chamber and 0.0001μ directly below at the diffusion pump.

Figure 2:
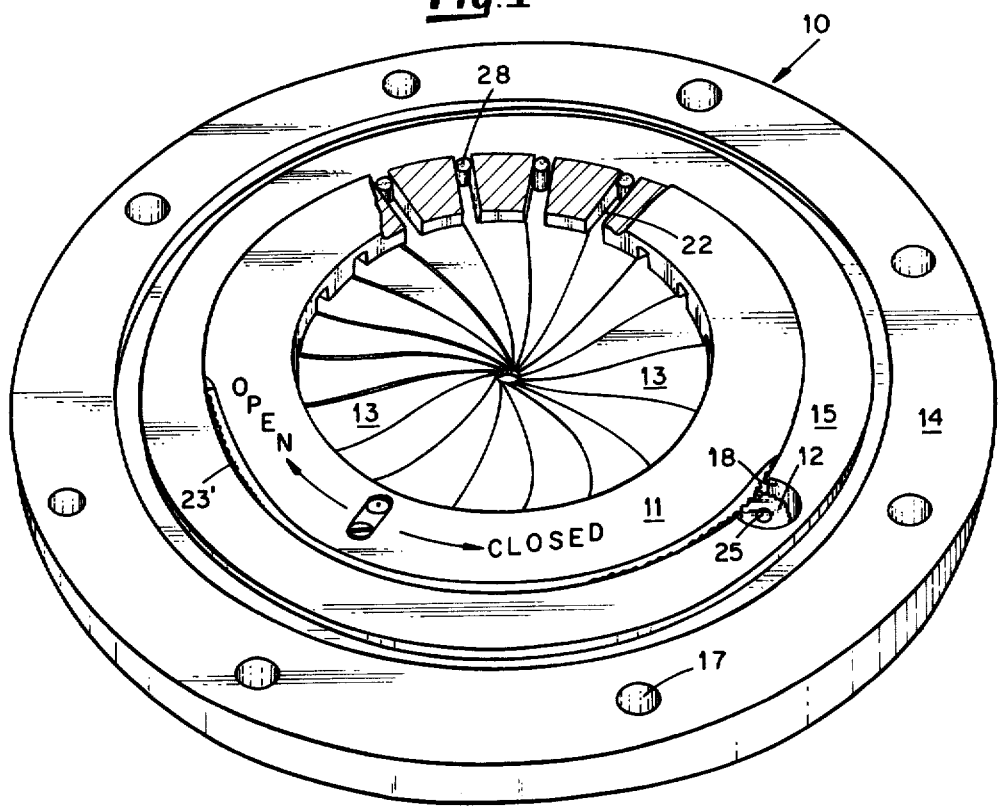
FIG. 2 is a view showing the shutters in the closed position.

Referring now to the drawings FIG. 1 illustrates a 20 leaf embodiment of the iris shutter type variable orifice mechanism in a partially closed position; while FIG. 2 illustrates the embodiment in its "closed" (0.025 inch diameter opening) position.

Figure 3:
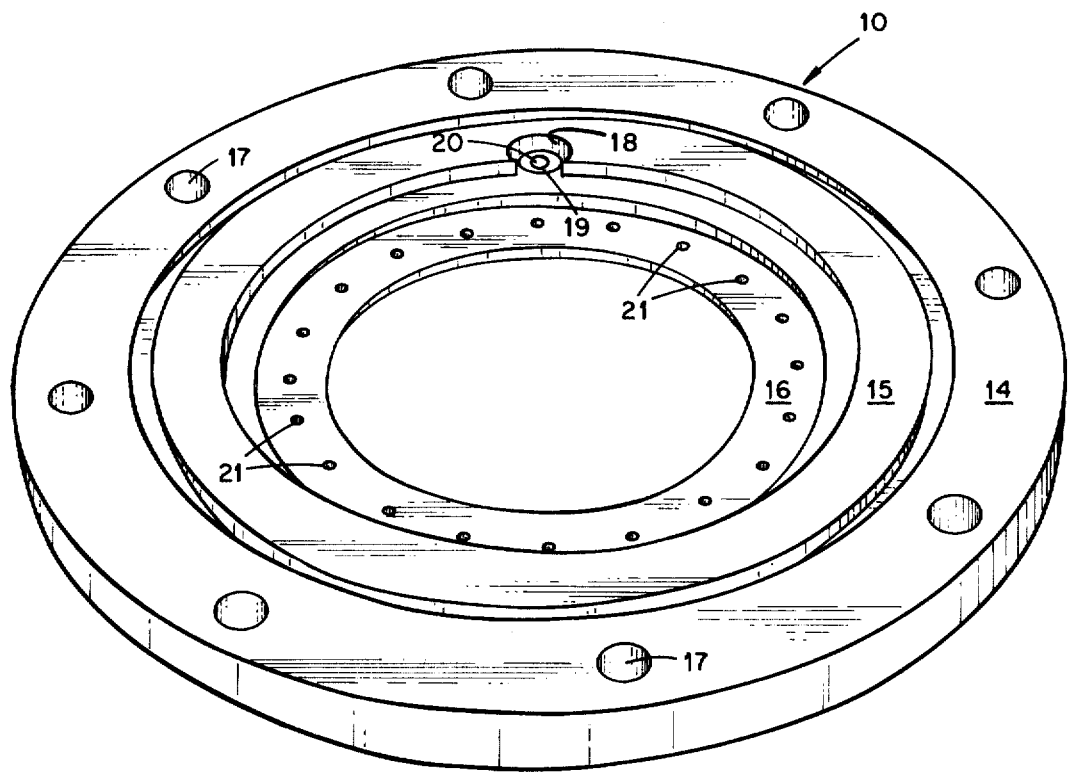
FIG. 3 is a view of the mounting ring of the FIG. 1 mechanism.
Figure 6:
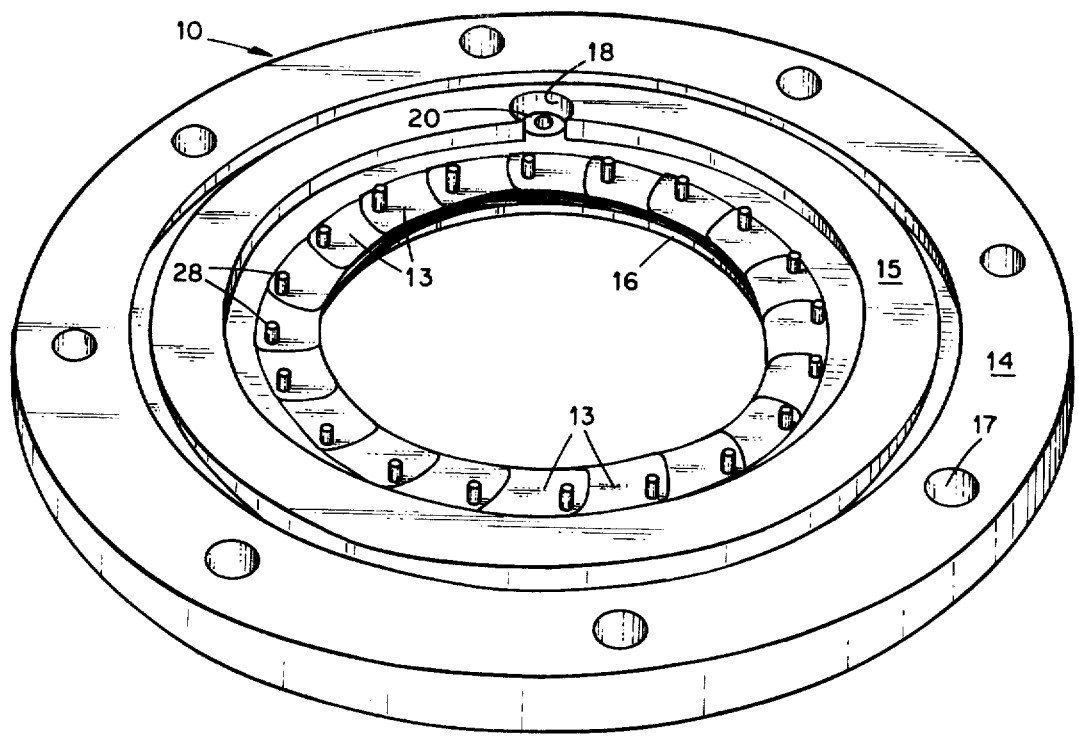
FIG. 6 shows the shutter leaves in place in the mounting ring of FIG. 3.
Figure 7:
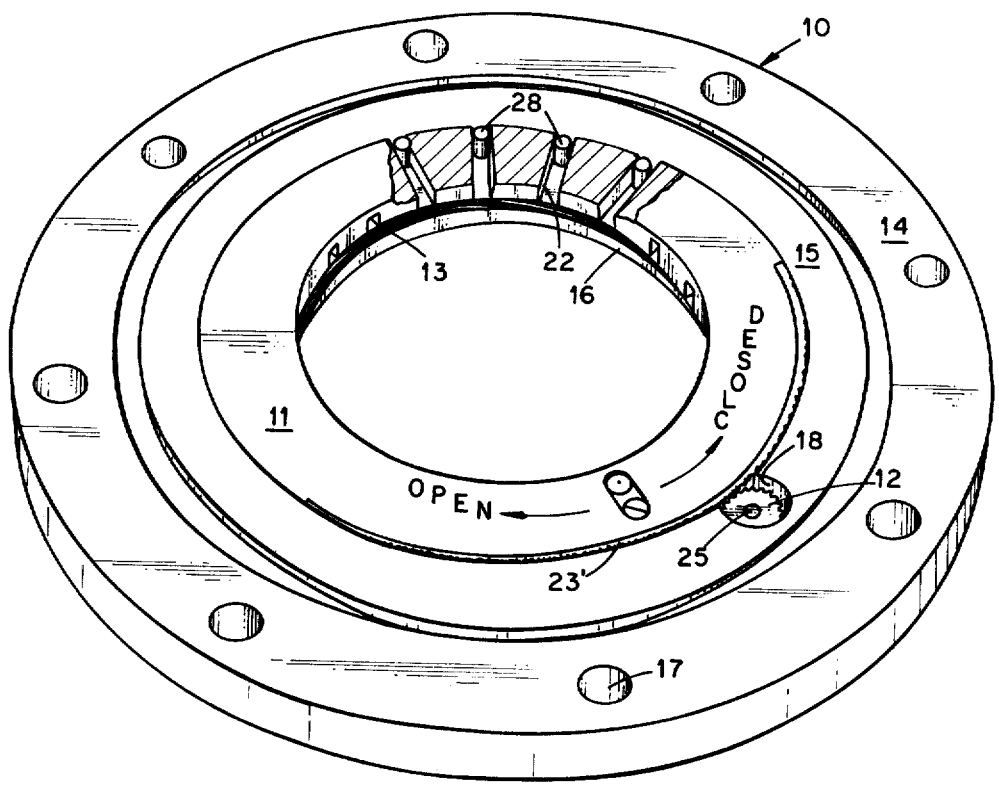
FIG. 7 shows the drive ring and the drive gear of FIG. 5 in place with the shutter leaves completely open.

FIGS. 3-5 illustrate the components of the iris shutter, while FIGS. 6 and 7 illustrate the assembly thereof, with FIG. 7 showing the shutter in its fully open position.

Referring now to FIGS. 3 to 5, the shutter components of this embodiment comprise generally a mounting ring 10, an orifice defining drive ring 11, a drive gear 12, and a plurality of members or leaves 13 (only four shown).

Mounting ring 10 (see FIG. 3) is constructed so as to define an outer or flange section 14, and intermediate section 15, and an inner section 16. Outer section 14 is provided with a plurality of apertures 17 therein by which the shutter mechanism is secured in an associated pipe or tubing system through which the medium to be controlled flows. Intermediate section 15 is provided with a countersink 18 adjacent the inner edge having an aperture 19 therein in which is mounted a bushing or sleeve 20 in which drive gear 12 is positioned. Inner section 16 is of reduced thickness thereby defining a cavity within which the leaves 13 and drive ring 11 are located, and is provided with a plurality of holes or apertures 21 (20 in this embodiment).

Drive ring 11 (see FIGS. 4 and 5) is provided on one side with a plurality of grooves or slots 22, and is provided about the periphery with a spur gear rack 23 having gear teeth 23' which cooperate with drive gear 12. Spur gear rack 23 is secured to ring 11 by screws as shown in FIG. 5. Note that gear teeth 23' are omitted from opposite portions of the spur gear rack 23 of drive ring 11.

Drive gear 12 (see FIG. 5) is provided with teeth 24 which cooperate with gear teeth 23' of drive ring 11 and includes a shaft 25 which extends through bushing or sleeve 20 in mounting ring 10.

Leaves or members 13, each consist of a curved body section 26 having a pivot pin 27 (see FIG. 4) at one end on one side and an offset pin 28 (see FIG. 5) at the other end on the opposite side. Pivot pins 27 of leaves 13 are positioned in apertures 21 of mounting ring 10, while offset pins 28 are located in grooves or slots 22 of drive ring 11.

As shown in FIG. 6, the leaves 13 are placed in overlapping position in the mounting ring 10 with the offset pins 28 extending upwardly over which the grooves 22 of drive ring 11 are placed and drive gear 12 is positioned in countersink 18 of mounting ring 10 such that teeth 24 thereof mesh with teeth 23' of drive ring 11, as shown in FIG. 7 with the leaves being withdrawn so as to define a fully open orifice in mounting ring 10. Rotation of drive ring 11 by drive gear 12 causes movement of the offset pins 28 in grooves 22 allowing the leaves 13 to move and thereby vary the size or diameter of the orifice or opening in mounting ring 10 as shown in FIGS. 1 and 2.

It has thus been shown that the present invention overcomes the problems associated with requirement for changing or varying the flow of a medium by providing a variable flow orifice forming mechanism capable, for example, of varying orifice diameter size from 6 inches to 0.25 inches which has been shown to be very effective for differential pumping in a vacuum system.

While a particular embodiment of the invention has been illustrated and described, modifications will become apparent to those skilled in the art, and it is intended to cover in the appended claims all such modifications as come within the spirit and scope of the invention.

What we claim is:

1. A variable orifice forming mechanism for controlling flow of medium therethrough comprising: a mounting ring defining a central orifice and consisting of an inner section, an intermediate section, and an outer section, a plurality of curved members pivotally mounted on said mounting ring, said inner section of said mounting ring having a plurality of spaced holes therein, said curved members each having an extending pivot pin located at one end thereof positioned in one of said holes, said intermediate section of said mounting ring having a thickness greater than said inner section and having a countersink therein, and said outer section of said mounting ring having a thickness greater than said intermediate section and being provided with means by which said mechanism is adapted to be secured to an associated system through which medium to be controlled flows, a drive ring having a plurality of grooves therein, said drive ring being positioned on said inner section of said mounting ring, said curved members having pins extending therefrom and movably secured in said grooves of said drive ring, and drive means mounted in said countersink of said intermediate section of said mounting ring for moving said drive ring with respect to said mounting ring thereby moving said curved members such that said orifice in said mounting ring is effectively changed in diameter.

2. The mechanism defined in claim 1, wherein the first mentioned pins in each of said curved members comprises an offset pin located at the opposite end of and opposite side from said pivot pin.

3. The mechanism defined in claim 2, wherein said drive ring is provided with a gear rack about at least a portion of the periphery thereof, and wherein said drive means comprises a drive gear and shaft assembly, said drive gear meshing with said gear rack of said drive means, whereby rotation of said shaft assembly rotates said drive gear causing movement of said drive ring with respect to said mounting ring which moves said curved members into and out of said orifice of said mounting ring thereby changing diameter of said orifice.

4. The mechanism defined in claim 3, wherein said curved members having a thickness in the range of about 0.015 inch to about 0.011 inch and said orifice having a diameter varying from about 0.25 inch to about 6 inches due to movement of said curved members.

* * * * *